United States Patent [19]

Maack

[11] Patent Number: 5,689,390
[45] Date of Patent: Nov. 18, 1997

[54] SCANNING DEVICE FOR A MAGNETIC-TAPE APPARATUS

[75] Inventor: Werner Maack, Seeheim, Germany

[73] Assignee: U.S. Philips Corporation, New York, N.Y.

[21] Appl. No.: 420,251

[22] Filed: Apr. 7, 1995

[30] Foreign Application Priority Data

Apr. 28, 1994 [DE] Germany ............ 44 14 842.9

[51] Int. Cl.$^6$ ............ G11B 5/56; G11B 21/29; G11B 5/027; G11B 5/52
[52] U.S. Cl. ............ 360/109; 360/85; 360/107
[58] Field of Search ............ 360/109, 85, 107

[56] References Cited

U.S. PATENT DOCUMENTS 4,318,146  3/1982  Ike et al. .................. 360/107

FOREIGN PATENT DOCUMENTS

| 0399517A2 | 11/1990 | European Pat. Off. ......... G11B 5/52 |
| 2445576 | 7/1980 | France .................. G11B 5/48 |
| 4110589 | 10/1992 | Germany . |
| 92160301 | 3/1993 | Germany . |
| 2252114 | 10/1990 | Japan . |

Primary Examiner—Stuart S. Levy
Assistant Examiner—Adriana Giordana
Attorney, Agent, or Firm—Brian J. Wieghaus

[57] ABSTRACT

The invention relates to a scanning device for a magnetic-tape apparatus, with a head disc which is rotatably mounted between an upper and a lower drum of a scanner and with head supports carrying magnetic heads, which supports are mounted at the periphery of the head disc. According to the invention, in order to simplify mounting and adjustment of the head supports, the head supports are constructed so as to allow them to be mounted on the head disc and adjusted from outside in a radial direction (R).

19 Claims, 3 Drawing Sheets

SCANNING DEVICE FOR A MAGNETIC-TAPE APPARATUS

BACKGROUND OF THE INVENTION

The invention relates to a scanning device for a magnetic-tape apparatus, with a head disc which is rotatably mounted between an upper and a lower drum of a scanner and with head supports carrying magnetic heads, which supports are mounted at the periphery of the head disc.

Such a scanning device is known, for example, from DE 41 10 589 A1. In the know device the head disc has segment-shaped recesses in its upper and lower plane surfaces for receiving head supports provided with magnetic heads. The heads are arranged in such a way that the magnetic recording heads are situated at one side and the magnetic reproducing heads are situated at the other side of the head disc. As a result of this, these head supports can be mounted only after removal of the scanner because the relevant fixing screws extend parallel to the scanner axis. This also applies to the adjustment screws. A similar construction is also disclosed in JP-OS 2-252 114 A.

DE-GM 92 16 030 describes a head-drum arrangement for video and/or audio equipment, which comprises a stationary head drum and a rotary head drum section carrying one or more magnetic heads mounted on head supports. The rotary head drum section has a pot-like shape with an axial opening, the head supports being placed onto the corresponding head-support surface and secured in the head drum section by means of screws via said opening. This also applies to the adjustment screws.

SUMMARY OF THE INVENTION

It is an object of the present invention to construct a scanning device of the type defined in the opening paragraph in such a manner that the magnetic heads can be mounted as well as adjusted in the non-removed condition of the scanner.

According to the invention this object is achieved in that the head supports are constructed so as to allow them to be mounted on the head disc and adjusted from outside in a radial direction. Such a construction enables mounting as well as adjustment without removal of the scanner being necessary. This results in a substantial reduction of the mounting and adjustment time, for example when replacement or readjustment of the magnetic heads is necessary. With the constructions known until now this required the removal of the entire scanner because the fixing and adjustment screws were only accessible in an axial direction, such a removal being no longer necessary in accordance with the invention.

In an embodiment of the invention a simple mounting of the head support is achieved in that the head disc has radially directed recesses for receiving the head supports at its periphery and in that the scanner has a mounting aperture in the area of the head disc at a location which is not in contact with the magnetic tape. Mounting and removal of the head support are then effected in such a manner that the head disc is rotated until a recess in the head disc appears behind the mounting aperture, so that the head support can be mounted and adjusted rapidly and without any problems.

Said mounting aperture may be formed, for example, either in the upper or in the lower drum or in some cases in both drums. This depends on the head disc arrangement.

Generally, a head support carries one magnetic head. However, it is also conceivable to use an advantageous construction in which the head support carries a plurality of magnetic heads, which are for example also adjustable together.

To secure the head support to the head disc each head support has at least one bore for a fixing screw, which cooperates with a corresponding threaded bore in the head disc. In the ideal case the corresponding recesses in the head disc may be adapted exactly to the dimensions of the head support so that adjustment is effected by mounting and, as a consequence, no readjustment is required. This is expensive but has the advantage that the head supports can simply be placed into the corresponding recesses and secured by the fixing screw without any special adjustment being necessary.

However, in most cases an adjustment will be required, for which purpose an embodiment of the invention comprises means for lateral and height adjustment of the head supports. In an embodiment of the invention each head support has two radial bores for receiving fixing/lateral-adjustment screws and its radial mounting surface has a vertical ridge-like projection between the bores. This ridge-like projection extends perpendicularly to a line through the centres of the mounting bores. Its cross-sectional shape may be, for example, semicircular, triangular or the like. Lateral adjustment is then effected in such a way that these fixing screws also serve as adjustment screws, the fixing screws being tightened to a greater or smaller extent depending on which side of the head support is to be adjusted.

In an embodiment of the invention lateral adjustment can be improved in that the fixing screws are provided with pressure springs arranged between the mounting surfaces.

In a further embodiment of the invention a simple height adjustment is possible in that each head support has a conical bore, centred between the fixing bores, for receiving a conical height adjustment screw, and in that the head support is elastic in the area of the conical bore and screw. By actuating this height adjustment screw the head support, which is elastic at this location, is locally deformed and thereby adjusts the height position of the magnetic head mounted on the head support.

A particularly simple and effective construction of a head support is obtained in that a slot, which extends down to a bottom wall, divides the head support, which is of a one-piece construction, into a rigid support section and a radially outward elastic support section on whose upper side a magnetic head is mounted. This results in a reliable fixation via the rigid support section and a simple height-adjustment possibility via the elastic support section.

In a further embodiment of the invention each head support has a male or female connector element and the head disc has correspondingly shaped male or female connector elements to provide the electrical connection after mounting of the head support. The connectors ensure a simple electrical connection during mounting.

In another effective embodiment the head support is of oval cross-sectional shape, the rigid support section carrying the electrical connector and the elastic support section carrying the magnetic head, which is preferably affixed by means of an adhesive.

BRIEF DESCRIPTION OF THE DRAWING

An exemplary embodiment of the invention is shown diagrammatically in FIGS. 1 to 6 of the accompanying drawings.

DETAILED DESCRIPTION OF THE PREFERRED EMBODIMENTS

Figure 1:
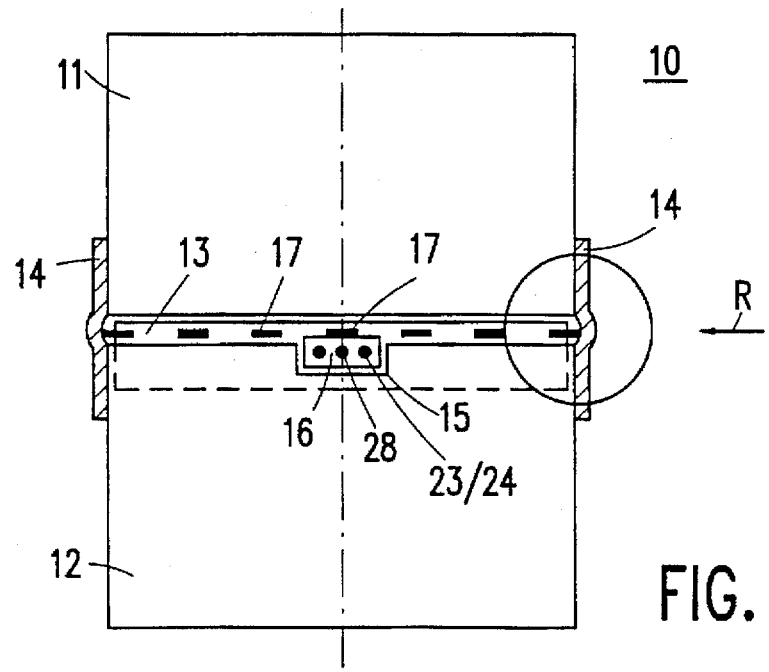
FIG. 1 is a side view of a scanner.
Figure 2:
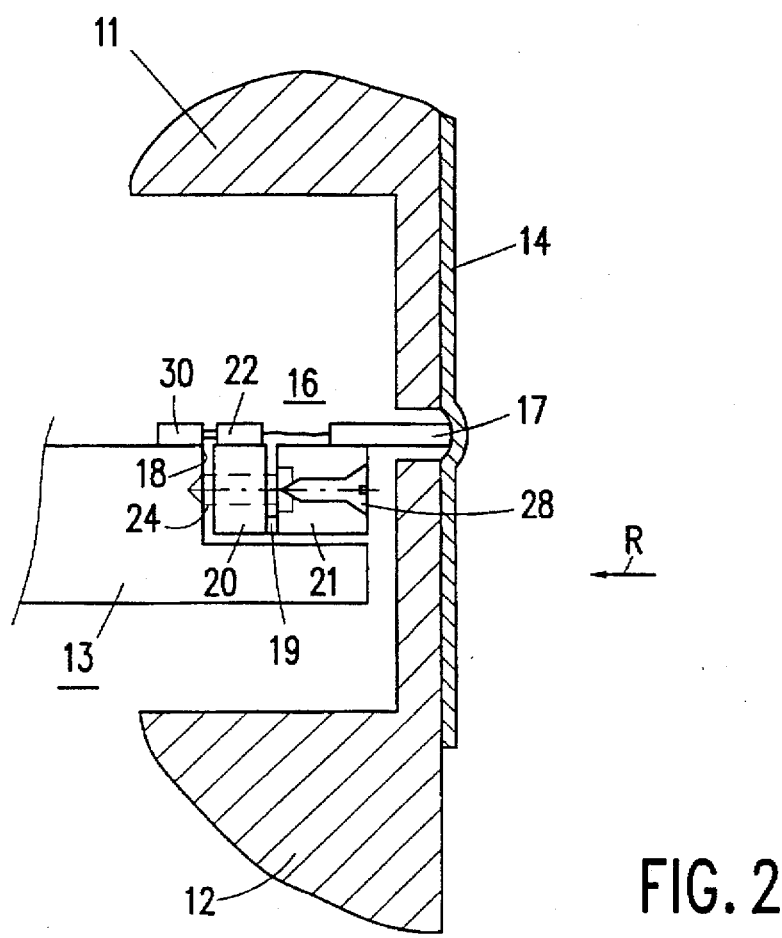
FIG. 2 is an enlarged-scale sectional view of this scanner at the location of the head disc.

FIGS. 1 and 2 show a scanner 10 comprising an upper drum 11, a lower drum 12 and a head disc 13, which is rotatably mounted between the upper drum 11 and the lower drum 12. A magnetic tape 14, which is not shown to scale, is wrapped around of the scanner 10 over the largest part of its circumference. In a part of the scanner which is not in contact with the tape, a mounting aperture 15 is formed in the lower drum 12 for mounting, removing and adjusting head supports 16, which carry magnetic heads 17 at their upper sides and which are mounted in recesses 18 in the head disc 13.

Figure 3:
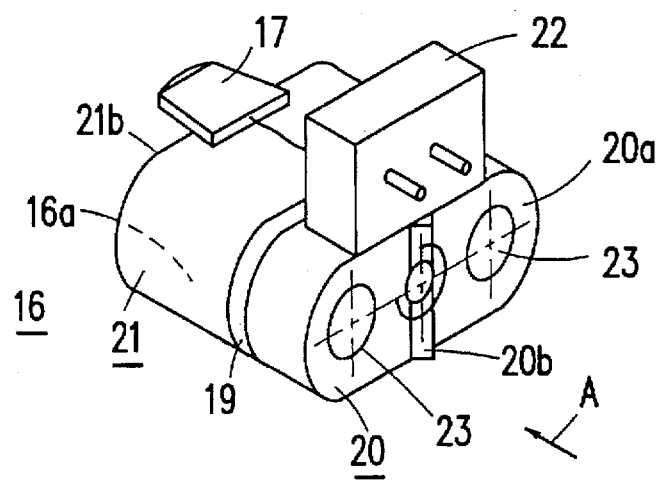
FIG. 3 is a perspective view of a head support.
Figure 4:
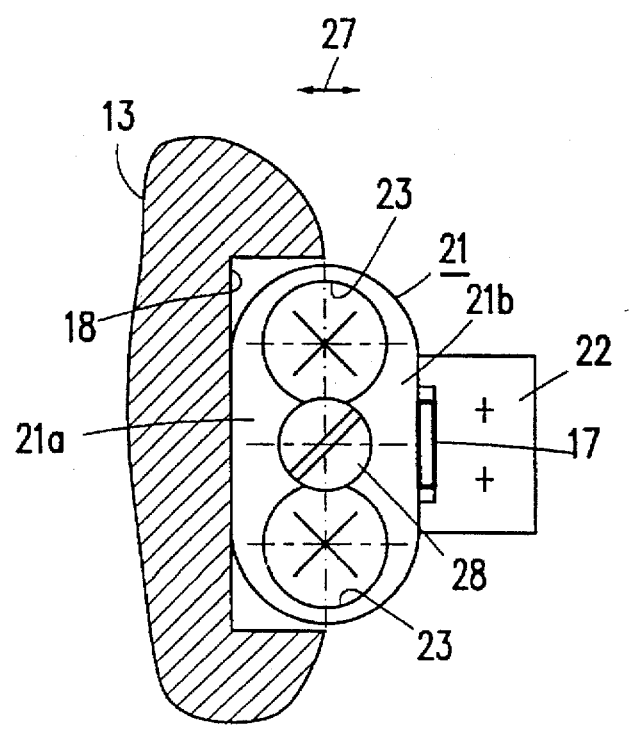
FIG. 4 shows the head support with a part of the head disc, viewed from the direction A in FIG. 3.
Figure 5:
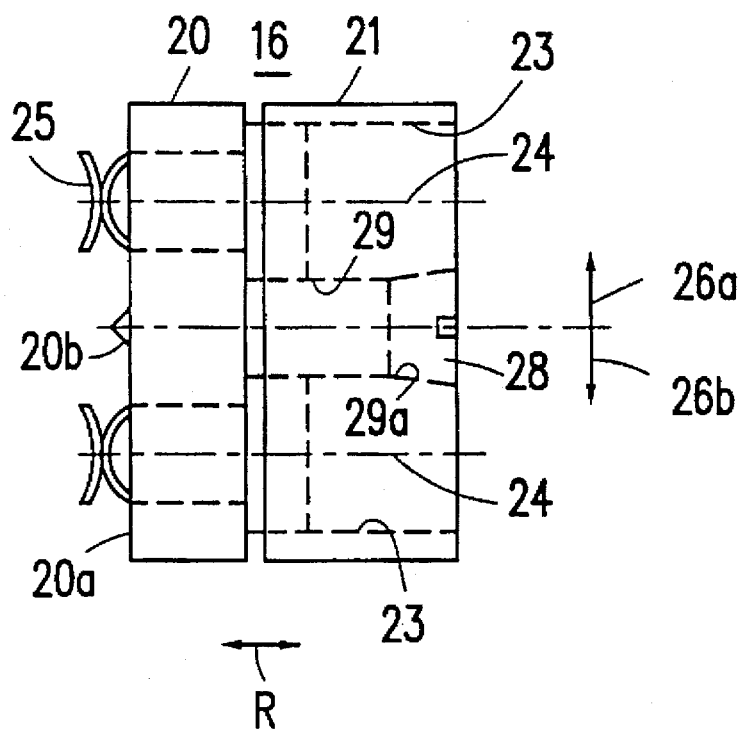
FIG. 5 is a diagrammatic plan view of the head support shown in FIG. 3 without the magnetic head and the electrical connector parts.

A head support 16, which is shown in more detail in FIGS. 3 to 5, is oval in cross-sectional shape and is divided into a rigid support section 20 and an elastic support section 21 by a slot 19 which extends down to its bottom wall 16a. The slot 19 separates the upper wall and the two side walls of the head support 16, so that the two support sections 20, 21 are merely connected to one another by the common bottom wall 16a. The rigid support section 20 carries an electrical connector 22, and the elastic support section 21 carries a magnetic head 17. The head support 16 has two radial bores 23 for receiving fixing screws 24 used for mounting in the recess 18 in the head disc 13. The radial surface 20a of the support section 20 carries a vertical ridge 20b of triangular cross-section, which serves for lateral adjustment of the head support 16. Pressure springs 25 may provide a better and simpler adjustment when the screws 24 are tightened or slackened, so that the head support 16 is adjustable in the direction 26a or 26b.

Height adjustment in the direction 27 is effected by means of an adjustment screw 28, which can be fitted into an adjustment bore 29 situated between the bores 23. The elasticity of the radially outward support section 21 is given by the slot 19 and the bores 23, 29. The bore 29 is conical in its upper part 29a, so that when it is tightened the conical screw 28 forces the elastic walls 21a, b of the elastic support section 21 apart. However, since the lower wall 21a lies on the supporting surface of the recess 18 in the head disc 13 (see FIG. 4), only the upper wall 21b will be deflected in the direction 27, so that the magnetic head 17 secured to this wall is thus adjustable in the direction 27.

Figure 6:
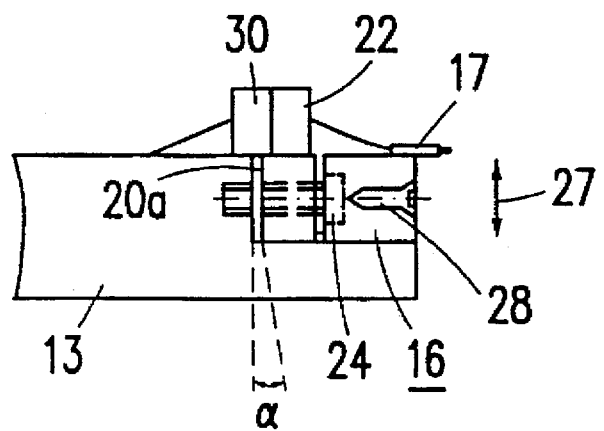
FIG. 6 shows diagrammatically a part of a head disc with a head support as shown in FIG. 3 in the mounted condition.

FIG. 6 shows a mounted head support 16 with an electrical connector 22, which in the mounted condition mates with a corresponding connector 30 of the head disc 13. In an embodiment of the invention the radial surface 20a of the support section 20 may be inclined as indicated by the angle α. Thus, it is possible to achieve that when fixing screws 24 are tightened the head support 16 is firmly urged against the mounting surface of the recess 18 with its bottom wall 16a or with the upper wall 21b.

I claim:

1. A scanning device for a magnetic tape apparatus, said scanning device comprising:

an upper drum and a lower drum each having an outer cylindrical surface substantially parallel to an axis of rotation, a head disc rotatably mounted between the upper and the lower drums, said head disc having a periphery adjacent to the upper and lower drums, and being rotatable about said axis of rotation, and one or more head supports, each head support carrying one or more magnetic heads, characterized in that:

said upper and lower drums comprise a mounting aperture in said outer cylindrical surface for receiving therethrough each of said head supports, wherein said head supports and head disc include means for fixing the head supports to the head disc and for adjusting the position of the head supports on the head disc, and are constructed so as to allow said head supports to be fixedly mounted and adjusted on said head disc through said mounting aperture only, without removal of the scanning device from the magnetic tape apparatus.

2. A device as claimed in claim 1, characterized in that the head disc has radially directed recesses for receiving the head supports (16) at its periphery and in that the mounting aperture is at a location in the drums which is not in contact with the magnetic tape.

3. A device as claimed in claim 2, characterized in that the head supports each have a radial bore for receiving a fixing screw to fix the head supports to the head disc.

4. A device as claimed in claim 3, characterized by means for lateral and height adjustment of the head support relative to the head disc.

5. A device as claimed in claim 4, characterized in that said means for lateral adjustment comprises each head support having two of said radial bores for receiving screws and a radial mounting surface with a ridge-like projection between the bores parallel to the axis of rotation and about which said each support is pivotable.

6. A device as claimed in claim 5, characterized in that the screws are provided with pressure springs arranged at the radial mounting surface.

7. A device as claimed in claim 6, characterized in that said means for height adjustment comprises each head support having a conical bore, centered between the two radial bores, for receiving a conical height adjustment screw, and in that the head support is elastic in the area of the conical bore and screw.

8. A device as claimed in claim 7, characterized in that each head support includes a bottom wall and is of one-piece construction, each head support including a slot which extends down to the bottom wall and divides the head support into a rigid support section and a radially outward elastic support section, the respective magnetic head being mounted on the elastic support section.

9. A device as claimed in claim 8, characterized in that the head support is of oval cross-sectional shape, the rigid support section carrying an electrical connector.

10. A device as claimed in claim 9, characterized in each head support has a male or female electrical connector element and the head disc has correspondingly shaped male or female electrical connector elements for mating with the connector element on the respective head support.

11. A device as claimed in claim 10, characterized in that the rigid support section includes the radial mounting surface and the head disc includes a corresponding mounting surface inclined relative to the radial mounting surface.

12. A device as claimed in claim 1, characterized in that the head supports each have at least one radial bore for receiving a fixing screw.

13. A device as claimed in claim 1, characterized by said head disc and each head support including means for lateral and height adjustment of the head supports relative to the head disc.

14. A device as claimed in claim 1, characterized in that each head support has two radial bores for receiving screws, and a radial mounting surface with a ridge-like projection between the bores and parallel to the axis of rotation about which said each head support pivots.

15. A device as claimed in claim 1, characterized in that each head support has a conical bore, bores, for receiving a conical height adjustment screw, and in that the head support is elastic in the area of the conical bore and screw.

16. A device as claimed in claim 1, characterized in that each head support is of a one-piece construction and includes a bottom wall, each head support including a slot which extends down to the bottom wall and divides the head support into a rigid support section and a radially outward elastic support section, the respective magnetic head being mounted on the elastic support section.

17. A device as claimed in claim 16, characterized in that the head support is of oval cross-sectional shape, the rigid support section carrying an electrical connector.

18. A device as in claim 16, characterized in that the rigid support section and the head disc have opposing mounting surfaces inclined relative to one another.

19. A device as claimed in claim 1, characterized in that each head support has a male or female electrical connector element and the head disc has correspondingly shaped male or female electrical connector elements.

* * * * *